March 23, 1954 — G. W. FREUND — 2,672,922
DETACHABLE BACK REST
Filed Nov. 14, 1952 — 2 Sheets-Sheet 1
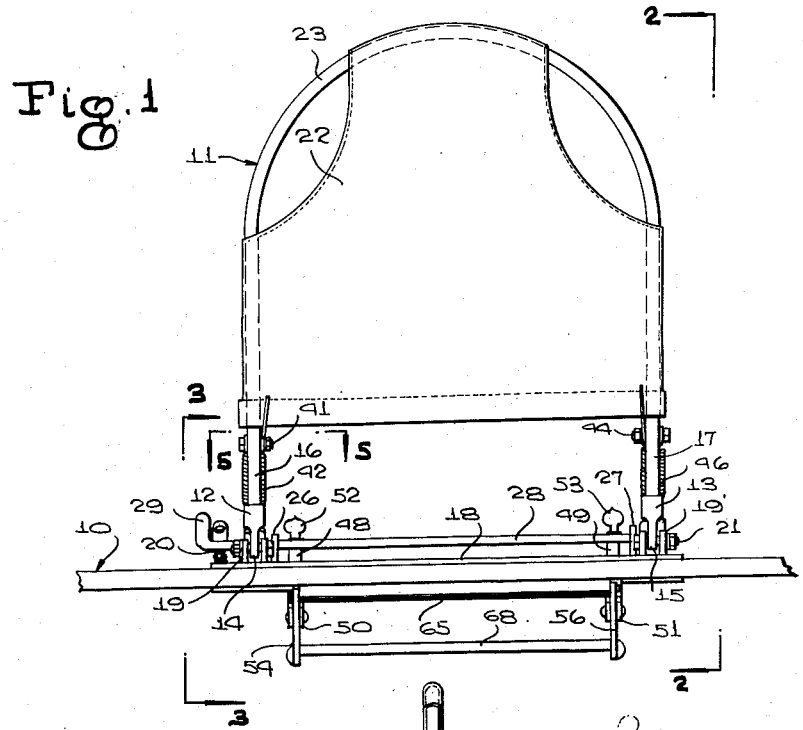
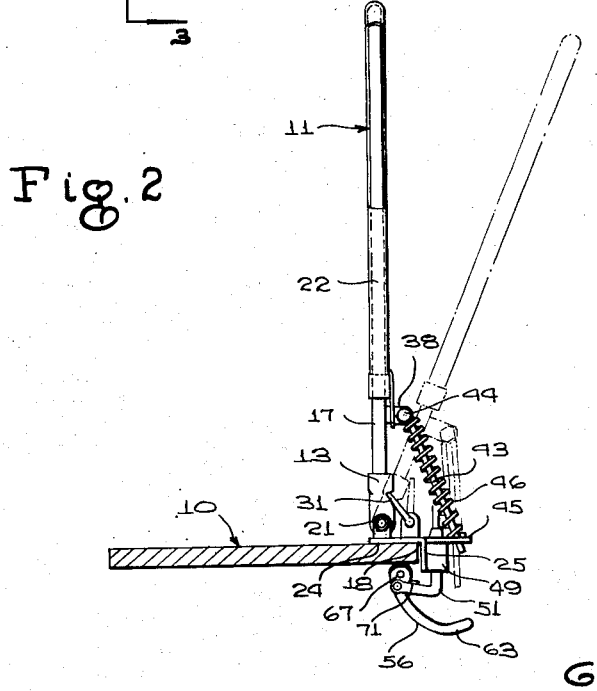
INVENTOR.
GEORGE W. FREUND
BY
McMorrow, Berman & Davidson
ATTORNEYS March 23, 1954     G. W. FREUND     2,672,922
DETACHABLE BACK REST
Filed Nov. 14, 1952     2 Sheets-Sheet 2
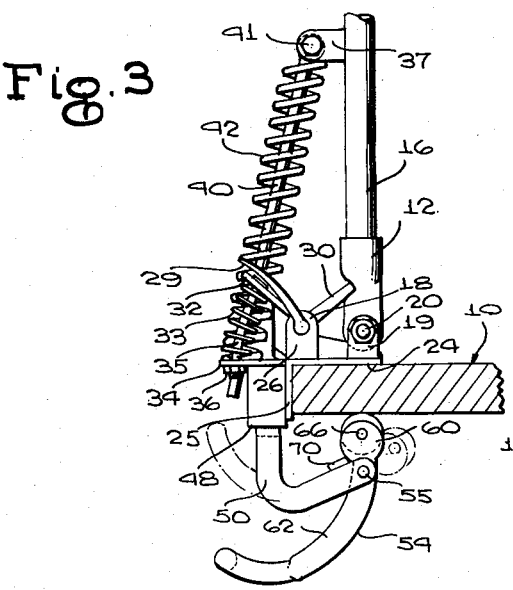
INVENTOR.
GEORGE W. FREUND
BY
McMorrow, Berman + Davidson
ATTORNEYS Patented Mar. 23, 1954

2,672,922

UNITED STATES PATENT OFFICE 2,672,922

DETACHABLE BACK REST

George W. Freund, Monroeville, Ohio

Application November 14, 1952, Serial No. 320,381

3 Claims. (Cl. 155—133)

This invention relates to portable back rests adapted to be detachably mounted on existing seat structures and more particularly to a back rest that can be quickly mounted on a flat seat, such as a boat or grandstand seat, and quickly detached from the seat, when desired.

It is among the objects of the invention to provide an improved back rest which can be firmly clamped onto a flat seat at one edge of the seat and can be quickly mounted upon and removed from the seat; which is adjustable for seats of different thicknesses and requires no modification of the seat construction for its application to the seat; which has a flexible back engaging portion and is spring urged toward upright position, so that it can be forced backwardly against the spring force; which has locking means for positively locking it in upright position; and which is simple and durable in construction, economical to manufacture, easy to apply and comfortable in use, and neat and attractive in appearance.

Other objects and advantages will become apparent from a consideration of the following description and the appended claims in conjunction with the accompanying drawings wherein:

Figure 1 is a front elevational view of a back rest illustrative of the invention shown mounted on a flat seat;

Figure 2 is a cross sectional view on the line 2—2 of Figure 1;

Figure 3 is a fragmentary cross sectional view on an enlarged scale on the line 3—3 of Figure 1;

Figure 4 is a fragmentary rear elevational view on an enlarged scale;

Figure 5 is a fragmentary cross sectional view on an enlarged scale on the line 5—5 of Figure 1; and Figure 6 is a fragmentary cross sectional view on the line 6—6 of Figure 4.

With continued reference to the drawings, the numeral 10 indicates a flat or plank seat, such as a rowboat or grandstand seat. These seats may be of different widths and thicknesses and have no backs, so that a person occupying such a seat for an extended period of time is subjected to unnecessary fatigue. The present invention provides a back rest which is detachably mounted on such a seat to support the back of a person occupying the seat and provide relaxation rather than undue fatigue.

The back rest comprises a U-shaped frame, generally indicated at 11, preferably formed of a length of metal tubing bent to U shape and having sockets 12 and 13 secured one on each end of the tube. The sockets are provided with apertured lugs, as indicated at 14 and 15, extending from the ends of the sockets remote from the leg portions 16 and 17 of the frame and a flat bar 18 extends across the open end of the frame 11 and outwardly of the sockets 12 and 13. Pairs of spaced apart apertured lugs, as indicated at 19 and 19', extend upwardly from the bar 18 and the lug 14 of the socket 12 is disposed between the lugs 19 and pivotally connected thereto by a pivot bolt 20, while the lug 15 of the socket 13 is disposed between the pair of lugs 19' and pivotally connected thereto by a pivot bolt 21.

A flexible back member 22, formed of fabric or other flexible sheet material, is disposed within and secured to the frame 11, this back portion preferably having marginal hems respectively receiving the leg portions 16 and 17 of the frame and a third marginal hem receiving the intermediate portion of the bight portion 23 of the frame.

The bar 18 is of right angular cross sectional shape and has one leg 24 adapted to rest upon the top of the seat 10 and from which the lugs 19 and 19' extend near one edge of this leg, and a leg 25 depending perpendicularly from the leg 24 at the other edge of the leg 24 and adapted to contact the rear edge of the seat 10. Apertured lugs 26 and 27 project upwardly from the leg 24 of the bar 18 rearwardly of the lugs 19 and 19' and a rod 28 extends through and is journaled in the lugs 26 and 27. A hand lever 29 is provided on one end of the rod 28 and disposed perpendicularly thereto, and locking arms 30 and 31 project radially from the rod 28, one opposite each of the frame sockets 12 and 13, and these locking arms 30 and 31 are engageable at their distal ends in notches provided in the frame sockets to positively hold the frame in its upright position.

A third arm 32 extends radially from the rod 28 and bears against the upper end of a compression spring 33 the lower end of which is supported on a bracket extension 34 projecting rearwardly from the bar 18, this spring acting to resiliently hold the locking arms 30 and 31 in engagement in the notches in the corresponding sockets 12 and 13 and being compressible by manual pressure on the hand lever 29 to release the locking arms from the frame sockets for rear tilting movements of the frame and back assembly. A curved spring guide 35 extends through the spring 33 and through an aperture in the bracket 34 to which the guide is secured by a nut 36 disposed below the bracket and threaded onto a screw threaded end portion of the guide.

Pairs of apertured lugs 37 and 38 extend rearwardly from the frame legs 16 and 17 respectively at locations spaced equal distances from the pivot bolts 20 and 21 and a guide rod 40 has at one end an eye formation disposed between the pair of lugs 37 and pivotally connected thereto by a pivot pin or bolt 41. This guide rod depends from the lugs 37 and extends slidably through an aperture in the bracket 34 and a compression spring 42 surrounds this guide rod between the bracket 34 and the lugs 37 to resiliently resist rearward tilting movements of the frame and back assembly. A guide rod 43, similar to the guide rod 40, has at one end an apertured eye formation disposed between the lugs 38 and pivotally connected thereto by a pivot bolt 44 and this guide rod 43 depends from the lugs 38 and extends slidably through an aperture in a bracket 45 projecting rearwardly from the bar 18 in alignment with the frame socket 13. A coiled compression spring 46 surrounds the rod 43 between the bracket 45 and the lugs 38 and also resiliently resists backward tilting movements of the frame and back assembly.

With this arrangement, when the seat and back assembly is released for rearward tilting movement by manual pressure on the hand lever 29, as explained above, the frame and back assembly can be forced rearwardly by overcoming the force of the springs 42 and 46.

Tubular sockets 48 and 49 are disposed in upright position at the rear of the bar 18 adjacent the brackets 34 and 45 respectively, and are rigidly secured to the leg 25 of the bar 18. An angle bracket 50 has one leg slidably received in the socket 48 and depending from the lower end of the socket and a second leg extending forwardly from the lower end of the socket received leg and terminating beneath the front portion of the leg 24 of the angle bar 18. A similar angle bracket 51 has one leg slidably received in the socket 49 and depending from the lower end of this socket, and a second extending forwardly from the lower end of the socket received leg and also terminating below the front portion of the leg 24 of the angle bar 18. Adjusting screws 52 and 53 extend through the upper ends of the sockets 48 and 49 respectively, and are engaged at their lower ends with the upper ends of the socket received legs of the angle brackets 50 and 51 to position the angle brackets at selected positions of adjustment relative to the sockets 48 and 49.

The legs of the angle brackets 50 and 51 projecting forwardly from the socket received legs of these brackets are bifurcated and apertured near their distal ends and a clamping lever 54 is disposed between the furcations of the angle bracket 50 and pivotally connected to this angle bracket at the distal end of the forwardly projecting leg thereof by a pivot pin 55 which extends through registering apertures in the bracket leg furcations and in the lever 54. A similar lever 56 is disposed between the furcations of the forwardly projecting leg of the angle bracket 51 and pivotally secured to the bracket 51 at the distal end of the forwardly projecting leg thereof by a pivot pin 57 extending through registering apertures in the bracket leg furcations and in the lever 56. The levers 54 and 56 are provided above the corresponding angle bracket legs with enlarged portions 60 and 61 respectively, preferably of partly circular shape and have longitudinally curved portions 62 and 63 respectively depending from the lever supporting bracket legs.

A clamping roller 65 extends between the enlarged end portions 60 and 61 of the levers 54 and 56 and is journaled at its ends on the enlarged end portions of the levers by arbors 66 and 67 projecting coaxially from the corresponding ends of the roller and received in apertures provided in the enlarged end portions of the levers. A bar 68 extends between the levers 54 and 56 and is connected at its ends to these levers at the lower ends of the levers to constitute a handle for moving the levers about their pivotal connections with the angle brackets 50 and 51 and rocking the clamp bar 65 to and away from its seat clamping position relative to the bar 18.

The clamping roller 65 is spaced from and substantially parallel to the bar 18 and, when rocked to a position at which the arbors 66 and 67 are substantially directly above the corresponding pivot pins 55 and 57, it engages the under side of the seat 10 on which the leg 24 of the angle bar 18 rests and firmly clamps the seat between itself and the angle bar to mount the back rest on the seat. Stop members 70 and 71 mounted on the upper edges of the forwardly projecting legs of the angle brackets 50 and 51 respectively, adjacent the pivot pins 55 and 57, are engaged by the enlarged upper end portions 60 and 61 of the levers 56 and 54 and stop the rocking movements of these levers at the position in which the clamping roller 65 is in its most effective clamping position relative to the angle bar 18, as explained above.

The angle brackets 50 and 51 are moved inwardly and outwardly of the corresponding sockets 48 and 49 by the screws 52 and 53 to adjustably position the clamp roller 65 relative to the leg 24 of the angle bar 18 to compensate for variations in the thickness of the seat to which the back rest is applied.

With this arrangement, the detachable back rest can be quickly mounted on a flat seat and can be locked in upright position by the arms 30 and 31 or released for backward tilting movement against the force of the compression springs 42 and 46, and can be quickly released and removed from the seat, when desired.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A back rest detachably mounted on a flat seat comprising a frame, a back disposed within said frame and secured thereto, a bar extending across one end of said frame and adapted to rest on a seat, means pivotally connecting said frame to said bar for backward tilting movement of said frame relative to said bar, spring means connected to said bar and said frame resiliently resisting backward tilting movement of said frame relative to said bar, manually operable clamping means carried by said bar and adapted to engage the under side of a seat on which said bar rests to detachably clamp the back rest to the seat, said clamping means comprising angle brackets connected to said bar at spaced apart locations therealong and having legs movable toward and away from said bar, levers pivotally mounted intermediate their length on said angle bracket legs, a seat engaging roller extending between and rotatably supported in said levers between said angle bracket legs and said bar, and hand operable means spaced from said roller and connected to said levers for swinging said levers about said pivotal connections with said angle brackets and moving said roller toward and away from said bar, and stop means on said angle bracket legs and engageable with the portions of said levers adjacent said roller for stopping the swinging movements of said levers when said roller is in its effective clamping position relative to said bar.

2. A back rest detachably mounted on a flat seat comprising a frame, a back disposed within said frame and secured thereto, a bar extending across one end of said frame and adapted to rest on a seat, means pivotally connecting said frame to said bar for backward tilting movement of said frame relative to said bar, spring means connected to said bar and said frame resiliently resisting backward tilting movement of said frame relative to said bar, manually operable clamping means carried by said bar and adapted to engage the under side of a seat on which said bar rests to detachably clamp the back rest to the seat, said clamping means comprising angle brackets connected to said bar at spaced apart locations therealong and having legs movable toward and away from said bar, levers pivotally mounted intermediate their length on said angle bracket legs, a seat engaging roller extending between and rotatably supported in said levers between said angle bracket legs and said bar, and hand operable means spaced from said roller and connected to said levers for swinging said levers about said pivotal connections with said angle brackets and moving said roller toward and away from said bar, and manually releasable locking means interposed between said bar and said frame positively locking said frame against backward tilting movement relative to said bar.

3. A back rest detachably mounted on a flat seat comprising a frame, a back disposed within said frame and secured thereto, a bar extending across one end of said frame and adapted to rest on a seat, means pivotally connecting said frame to said bar for backward tilting movement of said frame relative to said bar, spring means connected to said bar and said frame resiliently resisting backward tilting movement of said frame relative to said bar, and manually operable clamping means carried by said bar and adapted to engage the under side of a seat on which said bar rests to detachably clamp the back rest to the seat, said clamping means comprising angle brackets adjustably connected to said bar at spaced apart locations therealong and having legs adjustably movable toward and away from said bar, levers pivotally mounted intermediate their length on said angle bracket legs, a seat engaging roller extending between and journaled at its ends on said levers between said angle bracket legs and said bar, and a bar extending between and connected at its ends to said levers at locations spaced from said angle bracket legs in a direction away from the first mentioned bar and constituting a handle for swinging said levers about said pivotal connections with said angle brackets and moving said roller toward and away from said first mentioned bar.

GEORGE W. FREUND.

References Cited in the file of this patent
UNITED STATES PATENTS

| Number | Name | Date |
| --- | --- | --- |
| 1,279,229 | Bilan | Sept. 17, 1918 |
| 1,511,704 | Buck | Oct. 14, 1924 |
| 1,749,491 | Kokay | Mar. 4, 1930 |
| 1,852,012 | Hose | Apr. 5, 1932 |
| 1,980,748 | Di Bella | Nov. 13, 1934 |
| 2,152,014 | Ashe et al. | Mar. 28, 1939 |
| 2,508,769 | Osbon et al. | May 23, 1950 |
| 2,642,124 | Slowey et al. | June 16, 1953 |